United States Patent [19]
Sterling et al.

[11] Patent Number: 5,912,291
[45] Date of Patent: Jun. 15, 1999

[54] THERMOPLASTIC POLYMERS WITH POLYFLUOROALKYLSILOXANE MODIFIED SURFACES

[75] Inventors: Robert E. Sterling, Homosassa Springs; Eugene P. Goldberg, Gainesville, both of Fla.

[73] Assignee: RES Development Corporation, Lecanto, Fla.

[21] Appl. No.: 07/842,480

[22] Filed: Feb. 28, 1992

[51] Int. Cl.$^6$ ...................................................... C08K 5/24
[52] U.S. Cl. ........................................... 524/263; 505/102
[58] Field of Search ............................... 524/263; 525/102

[56] References Cited

U.S. PATENT DOCUMENTS

| | | | |
|---|---|---|---|
| 3,034,509 | 5/1962 | Bernstein et al. | 525/106 |
| 4,386,179 | 5/1983 | Sterling | 524/505 |
| 4,879,331 | 11/1989 | Endo et al. | 524/263 |
| 5,108,632 | 4/1992 | Thomas et al. | 252/32.7 E |

FOREIGN PATENT DOCUMENTS

| 1-282267 | 11/1989 | Japan | 524/263 |
|---|---|---|---|

*Primary Examiner*—Bernard Lipman
*Attorney, Agent, or Firm*—Kerkam, Stowell, Kondracki & Clarke, P.C.; Dennis P. Clarke

[57] ABSTRACT

A composition of matter formed by melt-blending a thermoplastic polymer and from about 0.01% to less than about 1.0%, by weight, of an additive comprising a polyfluoroalkylsiloxane, the additive having a lower surface energy than that of the polymer, and the blending resulting in a substantially homogenous admixture of the polymer and the additive. The admixture, upon cooling, results in a solid composition wherein a concentration of the additive through a cross-section of the solid composition is lower in the interior thereof and higher at the surfaces thereof.

10 Claims, No Drawings

THERMOPLASTIC POLYMERS WITH POLYFLUOROALKYLSILOXANE MODIFIED SURFACES

BACKGROUND OF THE INVENTION

1. Field of the Invention

The present invention relates to thermoplastic polymers modified with certain fluorocarbon additives.

2. Description of the Prior Art

It has recently been proposed to modify thermoplastic polymers by incorporating therein various oils, gums, etc.

U.S. Pat. No. 3,485,787 discloses that certain block copolymers may be extended by incorporating mineral oil therein. U.S. Pat. No. 3,830,767 teaches that bleeding of the extending oil from the block copolymer may be prevented by incorporating a petroleum hydrocarbon wax therein.

U.S. Pat. No. 4,123,409 relates to block copolymers having thermoplastic terminal blocks and an elastomeric intermediate block. The patent discloses blending with the copolymer a high molecular weight oil which is compatible with the elastomeric block portion of the copolymer. Where the elastomeric portion is a hydrocarbon, the oil employed is a mineral oil. Where the elastomeric block is a polysiloxane, a silicone oil is blended therewith.

U.S. Pat. No. 3,034,509 discloses the addition of silicone oil to polyethylene for use as surgical tubing.

U.S. Pat. No. 4,386,179 discloses the dispersion of a polysiloxane throughout an elastomeric thermoplastic hydrocarbon block copolymer.

Japanese Patent No. 60-104161 describes an anti-friction composite material comprising a resin and more than 1%, by weight, of a fluorocarbon oil which have been injection molded together in a manner such that the oil exudes onto the molded surfaces of the resin due to poor compatibility of the oil with the resin and differences in viscosity between the resin and oil to produce an anti-friction surface.

European Patent No. 222,201 mentions perfluorosilicone oils for use in vulcanizable non-thermoplastic rubber compositions. Their use is said, however, to result in difficulties with respect to mixing, a reduction in the vulcanization rate and a worsening of the compression set value and thermal stability.

There is continuous research leading to the development of novel polymeric materials whose properties are tailored by incorporating therein various additives.

In application Ser. No. 07/446,675, filed Dec. 6, 1989, now aBN there is described a composition of matter having advantageous properties formed by melt-blending a thermoplastic polymer and from about 0.01% to less than 1%, by weight, of a perfluorocarbon additive, the properties of the polymer and the additive being such that, in the solid product obtained, the concentration of the perfluorocarbon additive is a gradient through a cross-section of the solid from a lower value in the interior to a higher value at the surfaces thereof.

It is an object of the present invention to provide novel thermoplastic polymer compositions having unique properties and which find utility in a wide variety of applications.

It is another object of the invention to provide a novel method for preparing thermoplastic polymer compositions having properties and characteristics heretofore unattainable.

SUMMARY OF THE INVENTION

These and other objects are realized by the present invention which provides a composition of matter formed by melt-blending a thermoplastic polymer and from about 0.01% to less than about 1.0%, by weight, of an additive comprising a polyfluoroalkylsiloxane (PFAS), the additive having a lower surface energy than that of the polymer; the blending resulting in a substantially homogenous admixture of the polymer and the additive; the admixture, upon cooling, resulting in a solid composition wherein the concentration of the additive through a cross-section of the solid composition is lower in the interior thereof and higher at the surfaces thereof.

A further embodiment of the invention comprises a method of forming a composition of matter comprising a thermoplastic polymer and from about 0.01% to less than about 1.0%, by weight, of an additive comprising a polyfluoroalkylsiloxane, the additive having a lower surface energy than that of the polymer, the method comprising melt-blending, preferably in an efficient compounding blender, the polymer and the additive at a temperature above the glass transition temperature or softening point of the polymer, but below that having a deleterious effect on the polymer and the additive, and for a time sufficient to produce a substantially homogenous admixture of polymer and additive, followed by cooling the admixture to produce a solid composition wherein the concentration of additive through a cross-section of solid composition is lower in the polymer bulk thereof and higher at the surfaces thereof, i.e., is a gradient through a cross-section of the solid composition from a lower value in the interior or bulk thereof to a higher value at the surfaces thereof.

DETAILED DESCRIPTION OF THE INVENTION

Although most non-fluorinated polymers are not compatible with polyfluoroalkylsiloxane (PFAS) and are also not readily blended therewith because of the high specific gravity of the PFAS, the present invention is predicated on the discovery that thermoplastic polymers, when efficiently melt-blended with less than about 1%, by weight, of PFAS such that the additive is homogeneously distributed throughout the melt, yield, upon cooling, solid compositions which, because of the differences in thermodynamic compatibility and surface energy between the additive and the polymer, have higher concentrations of the additive at the surface than throughout the interior thereof.

In the phrase, "concentration of additive is a gradient through a cross-section from a lower value at the center thereof to a higher value at the surfaces," the term "gradient" is not intended to suggest that the concentration varies uniformly from the center of the composition to the surface. Although this may be the case with respect to some combinations of polymer and additive, typically a much higher concentration of the additive is found at the surfaces of the composition with a much smaller amount in the interior or bulk of the polymer.

This higher concentration of additive at the surface of the polymer enables the provision of a polymer composition having heretofore unattainable properties. Thus, using very low concentrations of additive below 1%, relatively high concentrations are attainable at the surface.

The high concentrations of additive at the surfaces provide compositions having the advantages of PFAS-like surface properties, i.e., greater hydrophobicity, lower surface energy, non-adherent surface characteristics, more chemically inert, lower friction, smoother, etc. In addition, the presence of the additive enhances molding operations since it reduces "sticking" of the composition to the mold surfaces and enhances mold release. Also, the additive will, because of the lubricant properties thereof, permit higher speed processing of extruded objects, i.e., films, fibers and other objects formed therefrom and with smoother surfaces, with the added benefits of shorter injection molding cycles and higher extrusion rates.

For biological or biomedical applications of the polymer compositions, the PFAS surfaces are especially advantageous since they exhibit superior biocompatibility in contact with tissue surfaces, cells, physiological fluids and blood as compared with most thermoplastic polymers.

The compositions of this invention are, therefore, particularly advantageous for such applications as blood and fluid handling, medical tubing, vascular grafts, mammary implants, joint and tendon prostheses, ocular implants and the like.

Fibers prepared from compositions of the invention possess superior surface smoothness and uniformity and handling properties for weaving as well as different textures and "feel" because of the surface properties imparted by the PFAS additives. In addition, the compositions and methods of the invention are advantageous and more economical in the manufacture of fibers since the high concentration of additive at the surfaces of the fiber facilitates high-speed processing with less damage to dies, shuttles and weaving equipment to produce more uniform, smooth melt-spun fibers.

For the most part, the basic bulk mechanical, physical and chemical properties of the thermoplastic polymer employed are retained or even enhanced for the compositions of the present invention, but acquire the PFAS surface properties of the additive due to the above-noted gradient concentration of the additive through a cross-section of the composition from a lower value in the bulk to a higher value at the surface. This makes the compositions of this invention also advantageous for molds such as those used for optical and electronic parts, i.e., contact lenses, and for electro-optical or electro-mechanical devices which require low surface energy and low friction surfaces, i.e, video tapes, compact discs for audio or video recording, electro-mechanical switches and the like.

The lower concentrations of additive in the interior portion of the thermoplastic can also advantageously modify the bulk mechanical, physical and chemical properties of the polymer, however, particularly with respect to the classes of thermoplastic polymers discussed hereinbelow.

A unique advantage associated with the compositions of the invention is that if cut into plural sections, the additive in the interior will migrate to the new surfaces formed by the cutting operation.

A wide variety of thermoplastic polymers may be utilized in the practice of the invention, as follows:

I. Polyolefins such as polyethylene, polypropylene, etc., are advantageously and preferably employed in the practice of the invention because fluorocarbon surface properties are achieved at very low overall PFAS additive concentrations.

II. Olefin copolymers and block copolymers such as ethylene-propylene, and styrene-olefin block copolymers such as styrene-butadiene, styrene-butadiene-styrene and styrene-ethylene/butylene-styrene and styrene graft copolymers such as styrene-butadiene-acrylonitrile (ABS) are another class of preferred polymers for the practice of the invention.

III. Polyether and polyamide polymers and block copolymers such as a polyether-polyamide are another class of preferred polymers for use in the practice of the invention.

IV. Polyesters such as polyethylene terephthalate (PET), polybutylene terephthalate (PBT), aromatic terephthalates and isophthalates, and polycarbonates and polyurethanes such as those with aromatic or aliphatic isocyanate derived polymers with polyether or polyester soft segments are also significantly improved by the method of the invention.

V. Other vinyl polymers also exhibit enhanced properties and fluorocarbon surfaces using the additives of this invention. Such polymers include acrylic and methacrylic polymers, i.e., polymethylmethacrylate, polymethacrylate, polybutylmethacrylate, etc., and polyvinyl chloride (preferably plasticized), and various aromatic vinyl polymers, i.e., polystyrene.

It is preferred to employ PFAS additives having a surface energy substantially lower than that of the polymer with which it is compounded in order to ensure high surface fluorine concentration.

Exemplary of PFAS additives suitable for the practice of the invention are the polyfluoroalkylsiloxanes having the formula:

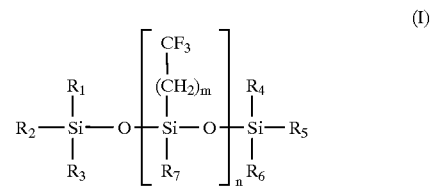

wherein $R_1$, $R_2$, $R_3$, $R_4$, $R_5$, $R_6$ and $R_7$ may be the same or different and may be alkyl, e.g., methyl, ethyl, propyl, butyl, octyl, dodecyl, cycloalkyl or aryl, etc., and may be substituted with fluoro groups. $R_7$ may also be —$(CH_2)_m$—$CF_3$; m is an integer from 0 to 20, and n is an integer from 1 to 5,000.

Other suitable PFAS additives include (a) copolymers of (I) with other polysiloxanes such as polydimethylsiloxanes and similar alkyl, aryl or alkyl-aryl siloxanes, and (b) polymethyl-3,3,3-trifluoropropyl siloxanes of Formula I wherein n is an integer from about 5 to about 500, and silanol terminated derivatives of the polyfluoroalkylsiloxane.

The selection of a particular PFAS will depend, of course, on the intended applications of the resultant composition.

Generally, it is preferred that the additive have a lower surface energy, by more than about 5 dynes/cm, as compared with the polymer with which it is compounded.

It is a particularly advantageous feature of the present invention that extremely small amounts of additive may be incorporated in the thermoplastic polymer to achieve the highly unusual and desirable properties associated with the compositions of the invention.

The method of the invention for compounding the polymer and additive enables the use of such small amounts by ensuring that the melt-blending step results in a homogenous admixture of the ingredients, one is able to obtain, upon cooling the melt, a solid composition having the above-described gradient concentration. If the ingredients are not homogeneously melt-blended, the product will comprise a composition wherein a substantial amount of unmixed free additive simply coats the surface of the polymer. Because of the incompatibility of the additive and the difference in surface energies between the polymers and the additive, the latter will not readily diffuse into and penetrate the polymer to any appreciable extent. Relatively uniform dispersion of the additive throughout the polymer during preparation requires homogenous blending in the melted state. This is not achievable by the mixing normally obtainable by injection-molding or single-screw extrusion. Attempts to mold or extrude thermoplastics blended with as little as 0.5 wt. % or 0.25 wt. % additive in modern screw/ram injection-molding machines or single-screw extruders results in substantial melt inhomogeneity and screw slippage in the melt with consequent erratic flow, making it impractical to form the polymer by simple molding or extrusion without first using the efficient high shear compounding blending method of the invention.

A melt-blending apparatus which ensures homogenous mixing of the ingredients is required. It has been found that a twin-screw compounding blender/extruder is particularly advantageous and is, therefore, preferred for carrying out the method of the invention.

Any suitable temperature which is below the decomposition temperature of either the polymer or additive, but above the softening point of the polymer and which ensures homogenous admixing of the ingredients, may be employed.

To facilitate admixing of the additive with the polymer, it is preferred to employ small particle sizes (e.g., pellets or powders) of the polymer. This ensures efficient wetting of the polymer particle surface prior to melt-blending, thereby ensuring efficient dispersion of the additive throughout the polymer.

In the most preferred embodiment, the additive is pre-mixed with a fraction of pelletized polymer and the thus wetted fraction or pre-mix is then admixed with the remainder of the polymer and subsequently melt-blended in an efficient high shear compounding extruder such as a twin-screw compounding extruder-blender.

A major improvement in melt processing for homogeneously blended compositions of this invention is achieved by the incorporation of <1 wt. % of the additive. In addition to smoother surface finish and more uniform melt flow which is critically important for forming precision parts, fibers and films, less torque or pressure is required for many compositions as compared to the normal thermoplastic polymer.

The invention is illustrated by the following non-limiting examples in which all percentages are by weight, except as otherwise indicated.

EXAMPLE 1

This example illustrates the need for highly efficient compounding blending for homogenous mixing to achieve the compositions of this invention and the inability to obtain such good mixing of the additives of this invention in conventional screw-ram injection-molding or normal screw extruders which are not designed for high shear compounding.

Pellets of an S-E/B-S thermoplastic (styrene-olefin block copolymer, Shell Kraton G) were added to the hopper of a screw-type injection-molding machine of the latest design and equipped with open loop electronic controllers for controlling injection speeds, pressures, speed change-over positions, screw rotation speeds, metering, decompression, etc. A mold for a 4.00"×4.00"×0.25" part was used and conditions were set and tested to ensure good molding of the part with the base polymer. The base polymer was then purged from the hopper and hopper screw. Base polymer was tumble-mixed with 0.5 wt. % polymethyltrifluoropropylsiloxane (viscosity 300 centistokes at 20° C.) to ensure uniform coating of the pellets which were then carefully introduced into the injection-molding machine screw for molding under conditions used for the base polymer. It was found, however, that the polymer containing 0.5 wt. % additive would not feed adequately for molding. Satisfactory molding could not be achieved despite testing a number of variations in screw speeds and other molding conditions. A similar result, inability to properly feed and mold the base polymer with additive, was observed using only 0.25 wt. % additive. A major problem was the slippage of material around the screw flights which resulted in a pressure through the screw which was inadequate to move the melt through the nozzle for satisfactory injection-molding. From this experiment, it is clear that homogenous blending is essential for preparing compounds which can be injection-molded or extruded to yield uniform parts. High shear compounding-blending, such as that achieved in a twin-screw compounding extruder of screw-flight design for efficient high shear melt-mixing, achieves such good blending for the preparation of the compositions of this invention.

EXAMPLE 2

The following procedure was employed to prepare the compositions identified herein.

A number of compositions were prepared with dispersed polymethyl-3,3,3-trifluoropropylsiloxane (PMTFPS) (viscosity 300 centistokes at 25° C.) in the following manner. The appropriate weight of the additive was added to about 100 grams of polymer pellets as a pre-mix. This was then added to 1–2 pound quantities of the polymer which was tumble-mixed to uniformly distribute the pre-mix pellets which had been wet with the additive. In initial experiments, concentrations in the range of 0.1 to 2.0% additive were used and the polymer-pellet pre-mix appeared uniform. The additive-mixed pellets were fed into an HBI System 90 microprocessor controlled torque rheometer twin-screw extruder (conical twin-screw, ¾-inch compounding blender/extruder, with a 2-inch heated strip-die head) to produce approximately 2-inch wide film extrusions of approximately 0.06-inch thickness. Post-extrusion equipment involved chilling rolls in a 3-roll take-up system. The extruder-rheometer provided information during the compounding and extrusion for torque, temperature, head pressure, etc. The extrusion blending was generally run at speeds of 20–50 rpm.

The following polymers were blended with additive:

1. High-density polyethylene containing 0.5%, 1.0% and 2.0% additive.
2. Styrene-ethylene/butylene styrene (SE/BS) block copolymer containing 0.6% additive.
3. Polyvinylchloride containing 0.5% additive.

Samples were removed from their protective bag and sections were obtained at random. Gloves were worn at all times while preparing samples for XPS and contact angle determination. All characterizations were performed on samples as received. The characterization techniques and conditions used were as follows:

a. Mechanical testing: Tensile tests were performed to determine the differences in ultimate tensile strength and elongation within each set of samples having the same base polymer. The samples used for mechanical testing were cut into dumbbell shapes by press and die and the long axes of these samples were consistent with the direction of extrusion. The total sample length is 2.5 inches and the gauge length is 0.75 inch with a width of 0.125 inch. Averages were taken from five samples per group. An Instron Model 1122 was used for mechanical testing. The cross head speed was 0.2 in/min. Sample set 3 was too brittle to cut.

b. XPS analyses: Collection and quantification of XPS data were performed with a Kratos XSAM 800 photoelectron spectrometer and a DS800 data system. The spectra were obtained using non-monochromatized MgKa radiation with a base pressure of $10^{-8}$ Torr and typical operating parameters of 12 Kv and 20 mA.

The results are set forth in the tables below.

TABLE 1

SE/BS WITH PMTFPS
Tensile Strength and % Elongation

| % Additive | UTS (PSi) | Elongation (%) |
|---|---|---|
| 0 | 825 | 525 |
| 0.6 | 2,090 | 1,750 |
| | XPS Data | |
| | F-Atomic % | Si-Atomic % |
| 0.6 | 38.2 | 4.1 |

TABLE 2

HIGH DENSITY POLYETHYLENE WITH PMTFPS
Tensile Strength and % Elongation

| % Additive | UTS (PSi) | Elongation (%) |
|---|---|---|
| 0 | 3,600 | 1,477 |
| 0.5 | 4,930 | 1,480 |
| | XPS Data | |
| | F-Atomic % | Si-Atomic % |
| 0.5 | 27.1 | 2.0 |

TABLE 3

PLASTICIZED PVC WITH PMTFPS
Tensile Strength and % Elongation

| % Additive | UTS (PSi) | Elongation (%) |
|---|---|---|
| 0.5 | 1,230 | 512 |
| | XPS Data | |
| | F-Atomic % | Si-Atomic % |
| 0.5 | 22.1 | 6.9 |

EXAMPLE 3

The procedure of Example 2 was employed to prepare compositions comprising (a) plasticized polyvinylchloride with 0.2% PMTFPS, (b) polypropylene with 0.5% and 2.0% PMTFPS, (c) polybutylene terephthalate with 0.5% PMTFPS, and (d) styrene-ethylene/butylene block copolymer blend containing ultra-low molecular weight polyethylene with 0.2% PMTFPS. Each of the compositions exhibit higher surface concentrations of fluorine and silicon than the amount added to the base polymer by XPS analysis.

We claim:

1. A composition of matter formed by melt-blending a thermoplastic polymer and from about 0.01% to less than about 1.0%, by weight based on the weight of the composition, of an additive comprising a polyfluoroalkylsiloxane, said additive having a lower surface energy than that of said polymer; said melt-blending resulting in a substantially homogenous admixture of said polymer and said additive; said admixture, upon cooling, resulting in a solid composition wherein a concentration of said additive through a cross-section of said solid composition is lower in the interior thereof and higher at the surfaces thereof; said additive being a polyfluoroalkylsiloxane having the formula:

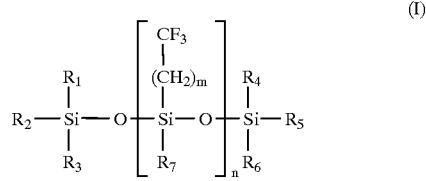

wherein $R_1$, $R_2$, $R_3$, $R_4$, $R_5$, $R_6$ and $R_7$ may be the same or different and may be alkyl, cycloalkyl or aryl; $R_7$ may also be $-(CH_2)_m-CF_3$; m is an integer from 0 to 20, and n is an integer from 1 to 5,000; or said additive being a silanol terminated derivative of said polyfluoroalkylsiloxane or a copolymer of said polyfluoroalkylsiloxane with an alkyl, aryl or alkyl-arylsiloxane.

2. A composition according to claim 1 wherein said additive is a poly-trifluoropropylmethylsiloxane.

3. A composition according to claim 1 wherein said thermoplastic polymer is a polyolefin homopolymer or a polyolefin copolymer.

4. A composition according to claim 1 wherein said thermoplastic polymer is a styrene-olefin block copolymer.

5. A composition according to claim 1 wherein said thermoplastic polymer is a polyamide or polyamide copolymer.

6. A composition according to claim 1 wherein said thermoplastic polymer is a polyester, polycarbonate or polyurethane.

7. A composition according to claim 1 wherein said thermoplastic polymer is polymethylmethacrylate, an acrylic or methacrylic polymer, polyvinyl chloride, polystyrene or a copolymer thereof.

8. A method of forming a composition of matter comprising a thermoplastic polymer and from about 0.01% to less than about 1.0%, by weight, of an additive comprising a polyfluoroalkylsiloxane, said additive having a lower surface energy than that of said polymer; said method comprising melt-blending said polymer and said additive at a temperature above the glass transition temperature or softening point of the polymer, but below that having a deleterious effect on said polymer and said additive, and for a time sufficient to produce a substantially homogenous admixture of said polymer and said additive, followed by cooling said admixture to produce a solid composition wherein the concentration of said additive through a cross-section of said solid composition is lower in the interior thereof and higher at the surfaces thereof.

9. A method according to claim 8 including a preliminary step of forming a pre-mix comprising a fractional portion of said thermoplastic polymer in particulate form substantially uniformly wetted with said additive and mixing said wetted first fraction with the remainder of said thermoplastic polymer.

10. A composition according to claim 1 wherein each of said alkyl groups may be methyl, ethyl, propyl, butyl, octyl or dodecyl.

* * * * *